(12) United States Patent
Li (10) Patent No.: US 6,873,462 B2
(45) Date of Patent: Mar. 29, 2005

(54) THREE-PORT CIRCULATOR (75) Inventor: Wei-Zhong Li, San Jose, CA (US)

(73) Assignee: Oplink Communications, Inc., San Jose, CA (US)

( * ) Notice: Subject to any disclaimer, the term of this patent is extended or adjusted under 35 U.S.C. 154(b) by 121 days.

(21) Appl. No.: 10/119,785

(22) Filed: Apr. 9, 2002

(65) Prior Publication Data

US 2003/0193716 A1 Oct. 16, 2003

(51) Int. Cl.[7] .............................................. G02B 27/28
(52) U.S. Cl. ...................................... 359/484; 359/495
(58) Field of Search ................................. 359/484, 494, 359/495, 496, 497; 385/11

(56) References Cited

U.S. PATENT DOCUMENTS

| 4,548,478 A | 10/1985 | Shirasaki |
| 5,212,313 A | 5/1993 | Kenyon et al. |
| 5,402,509 A | 3/1995 | Fukushima |
| 5,408,354 A | 4/1995 | Hosokawa |
| 5,493,440 A | 2/1996 | Souda et al. |
| 5,499,132 A | 3/1996 | Tojo et al. |
| 5,606,439 A | 2/1997 | Wu |
| 5,930,039 A * | 7/1999 | Li et al. ..................... 359/484 |
| 6,052,228 A | 4/2000 | Xie et al. |
| 6,061,167 A | 5/2000 | Song |
| 6,282,025 B1 | 8/2001 | Huang et al. |
| 6,310,989 B1 | 10/2001 | Liu |
| 6,331,913 B1 | 12/2001 | Huang et al. |
| 6,339,661 B1 * | 1/2002 | Kokkelink et al. ........... 385/11 |
| 6,466,704 B1 | 10/2002 | Frisken |
| 6,480,331 B1 | 11/2002 | Cao |
| 6,507,422 B1 | 1/2003 | Fukushima |
| 6,628,455 B1 | 9/2003 | Lee |
| 6,628,461 B2 | 9/2003 | Huang et al. |
| 2001/0053022 A1 | 12/2001 | Tai et al. |
| 2002/0008901 A1 | 1/2002 | Kinoshita |
| 2002/0060843 A1 | 5/2002 | Huang et al. |
| 2002/0191284 A1 * | 12/2002 | Chang et al. ................ 359/484 |

* cited by examiner

Primary Examiner—Mark A. Robinson
Assistant Examiner—Lee Fineman
(74) Attorney, Agent, or Firm—Fish & Richardson, P.C.

(57) ABSTRACT

A three-port circulator includes a non-reciprocal rotating element, a first birefringent wedge, and a second birefringent wedge. The non-reciprocal rotating element has a rotation axis and rotates the polarization of light passing through it by an predetermined angle. The first birefringent wedge has a first optical axis substantially perpendicular to the rotation axis. The second birefringent wedge has a second optical axis substantially perpendicular to both the rotation axis and the first optical axis. The second birefringent wedge is optically coupled between the non-reciprocal rotating element and the first birefringent wedge.

18 Claims, 6 Drawing Sheets

THREE-PORT CIRCULATOR

The present invention relates generally to optical technology.

BACKGROUND OF THE INVENTION

Figure 1:
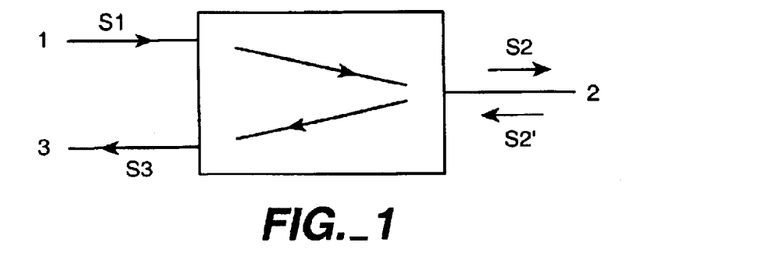
FIG. 1 illustrates a three-port circulator 10 including ports 1, 2, and 3.

Optical circulators are commonly used in optical communication systems and optical measurement systems. FIG. 1 shows a three-port circulator 10 that has ports 1, 2, and 3. Each of ports 1, 2, and 3 can be coupled to a Polarization Maintenance ("PM") fiber. As shown in FIG. 1, a polarized optical signal S1 entering port 1 exits from port 2 as a polarized optical signal S2. A polarized optical signal S2' entering port 2 exits from port 3 as a polarized optical signal S3.

SUMMARY OF THE INVENTION

In one aspect, the invention provides a three-port circulator. The three-port circulator includes a non-reciprocal rotating element, a first birefringent wedge, and a second birefringent wedge. The non-reciprocal rotating element has a rotation axis and is adapted to rotate a polarization of light passing therethrough by a predetermined angle. The first birefringent wedge has a first optical axis substantially perpendicular to the rotation axis. The second birefringent wedge has a second optical axis substantially perpendicular to both the rotation axis and the first optical axis. The second birefringent wedge is optically coupled between the non-reciprocal rotating element and the first birefringent wedge. The three-port circulator can also include a first lens optically coupled to the first wedge. The three-port circulator can also include a second lens optically coupled to the second wedge. The non-reciprocal rotating element in the three-port circulator can be a Faraday rotator.

In another aspect, the invention provides a method for constructing a three-port circulator having a first port, a second port and a third port. The method includes the step of providing a non-reciprocal rotating element for rotating a polarization of light passing therethrough by a first angle with respect to a rotation axis. The method includes the step of providing a first birefringent wedge having a first optical axis. The method includes the step of providing a second birefringent wedge having a second optical axis forming a second angle with the first optical axis. The method includes the step of directing an input polarized optical signal received from the first port to pass sequentially through the first birefringent wedge, the second birefringent wedge, and the non-reciprocal rotating element, to provide an output polarized optical signal directed to the second port. The method includes the step of directing an input polarized optical signal received from the second port to pass sequentially through the non-reciprocal rotating element, the second birefringent wedge and the first birefringent wedge, to provide an output polarized optical signal directed to the third port.

Aspects of the invention can include one or more of the following advantages. Implementations of the invention may provide a three-port circulator that has small insertion loss, compact size, and reduced manufacturing cost. Other advantages will be readily apparent from the attached figures and the description below.

BRIEF DESCRIPTION OF THE DRAWINGS

FIG. 2b illustrates a specific configuration of the birefringent wedges and the Faraday rotator shown in FIG. 2a.

DETAILED DESCRIPTION OF THE INVENTION

The present invention relates to an improvement in optical technology. The following description is presented to enable one of ordinary skill in the art to make and use the invention and is provided in the context of a patent application and its requirements. Various modifications to the invention will be readily apparent to those skilled in the art and the generic principals herein may be applied to other implementations. Thus, the present invention is not intended to be limited to the implementations shown, but is to be accorded the widest scope consistent with the principals and features described herein.

The present invention will be described in terms of a three-port circulator having specific components having specific configurations. Similarly, the present invention will be described in terms of components having specific relationships, such as distances or angles between components. However, one of ordinary skill in the art will readily recognize that the devices and systems described can include other components having similar properties, other configurations, and other relationships between components.

Figure 2A:
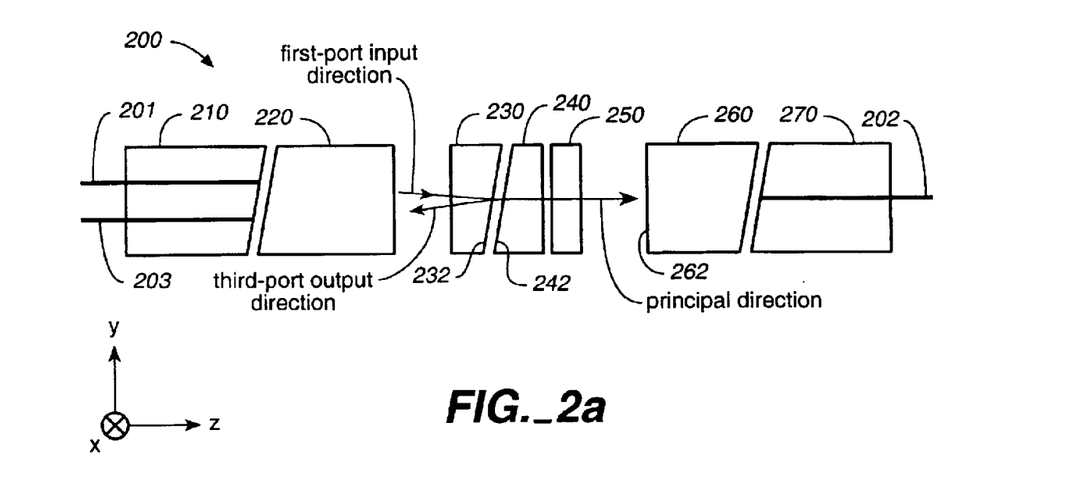
FIG. 2a illustrates an implementation of a three-port circulator.

FIG. 2a illustrates an implementation of a three-port circulatior 200. Three-port circulator 200 includes a birefringent wedge 230, a birefringent wedge 240, and a non□reciprocal rotating element such as Faraday rotator 250. Three-port circulator 200 can includes lens 220 for optically coupling PM fibers 201 and 203 to birefringent wedge 230, and lens 260 for optically coupling a PM fiber 202 to Faraday rotator 250. The positions of PM fibers 201 and 203 can be fixed with a capillary 210. The position of PM fiber 202 can be fixed with a capillary 270.

Birefringent wedges 230 and 240 are in the form of tapered plates. Surface 232 of birefringent wedge 230 faces surface 242 of birefringent wedge 240. In one implementation of three-port circulator 200, surface 232 substantially parallels surface 242. Surface 232 can contact surface 242 directly, or indirectly through other optical medias (including air).

Figure 2B:
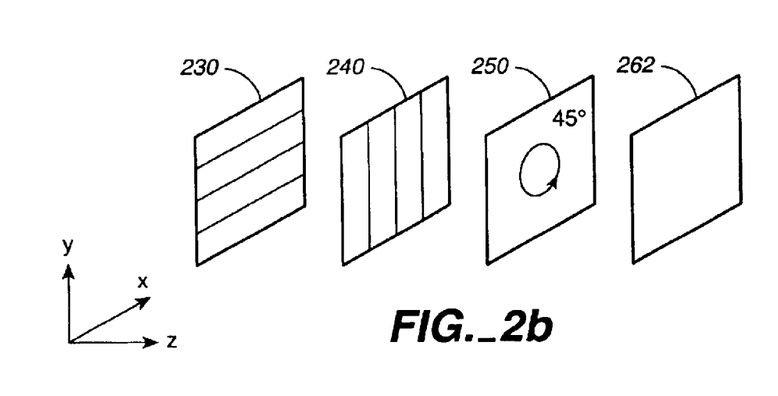

In FIGS. 2a and 2b, a coordinate system including the x-direction, the y-direction and the z-direction is illustrated. As shown in FIG. 2b, the optical axis of birefringent wedge 230 is in the x-direction. The optical axis of birefringent wedge 240 is in the y-direction. Faraday rotator 250 is designed in such a way that, when light passes through Faraday rotator 250 either in the positive or the negative z-direction, the polarization of the light will be rotated 45 degrees with respect to the positive z-axis. Surface 262 of lens 260 faces Faraday rotator 250. Three-port circulator 200 has a principal direction that is in the positive z-direction. Three-port circulator 200 also has a first-port direction that is in the z−αy direction, and a third-port direction that is in the −z−β y direction, where α and β are positive numbers.

Figure 3A:
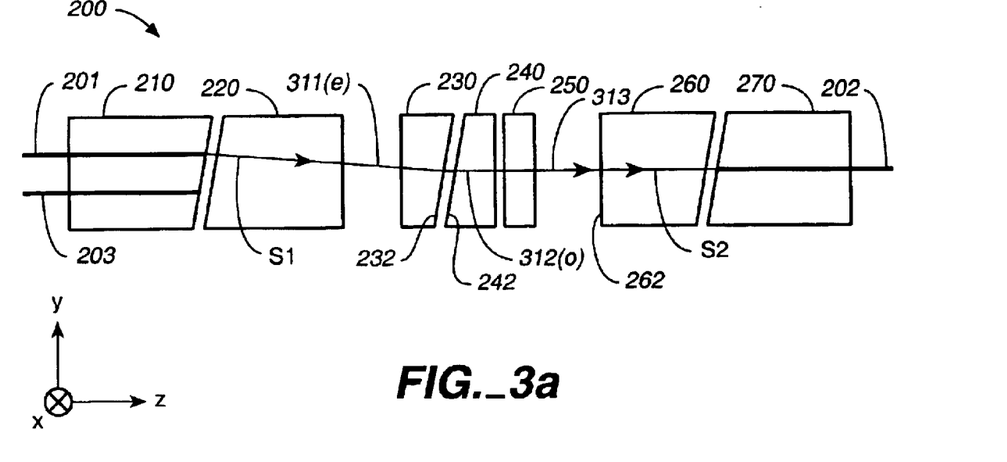
FIGS. 3a and 3b illustrate that a polarized optical signal S1 exiting from PM fiber 201 enters PM fiber 202 as a polarized optical signal S2.
Figure 3B:
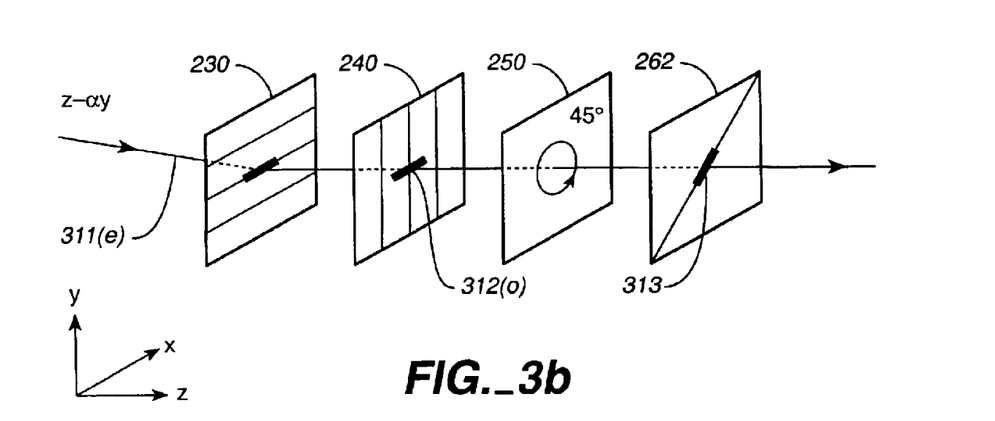

FIGS. 3a and 3b illustrate that polarized optical signal S1 exiting from PM fiber 201 enters PM fiber 202 as polarized optical signal S2. In more detail, polarized optical signal S1 exits from PM fiber 201 as light 311(e) with the x-polarization, and enters birefringent wedge 230 as an e-ray in an input direction (i.e., the z−αy direction). Light 311 (e) is refracted at surfaces 232 and 242, and become light 312(o) traveling in the principal direction (i.e., the positive z-direction). Light 312(o) enters birefringent wedge 240 as an o-ray with the x-polarization, passes through Faraday rotator 250, and become light 313 with the x+y polarization traveling in the principal direction. Light 313 enters PM fiber 202 through lens 260 as polarized optical signal S2.

Figure 4A:
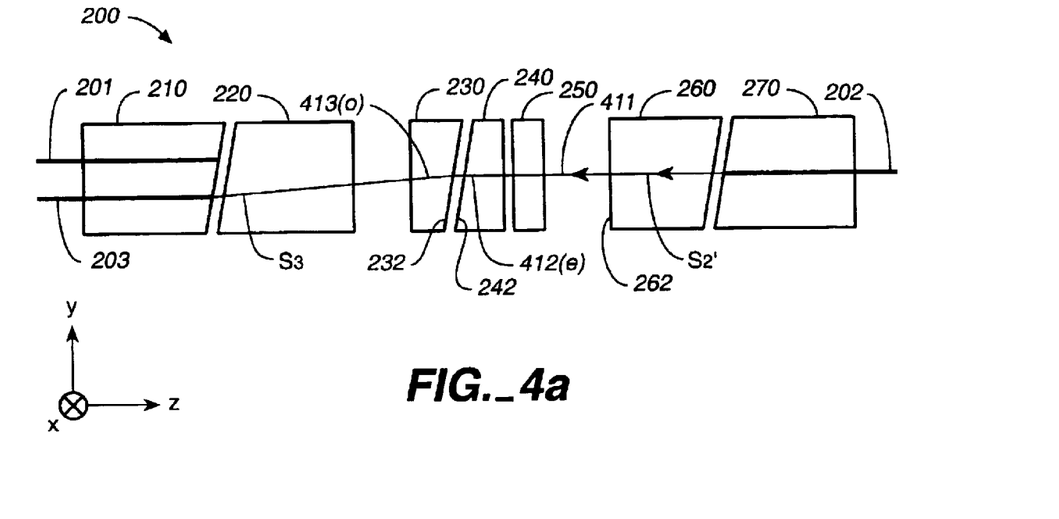
FIGS. 4a and 4b illustrate that a polarized optical signal S2' exiting from PM fiber 202 enters PM fiber 203 as a polarized optical signal S3.
Figure 4B:
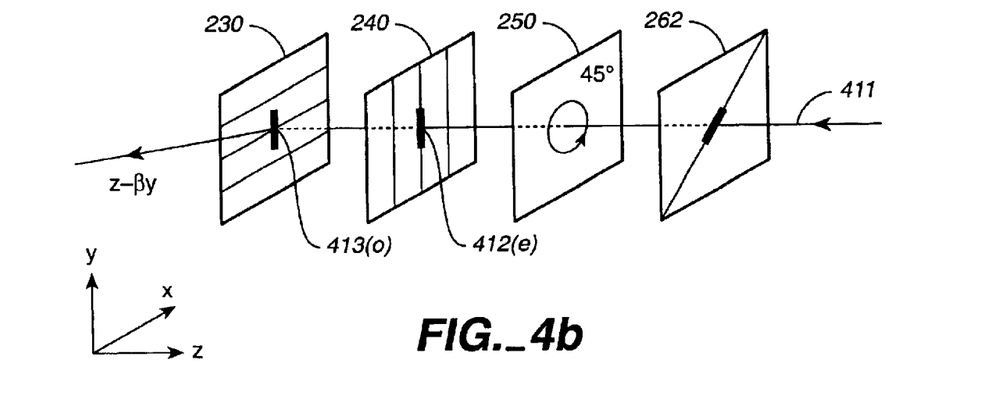

FIGS. 4a and 4b illustrate that polarized optical signal S2' exiting from PM fiber 202 enters PM fiber 203 as polarized optical signal S3. In more detail, polarized optical signal S2' exits from PM fiber 202 as light 411 with the x+y polarization traveling in the reverse principal direction (i.e., the negative z-direction). Light 411 with the x+y polarization passes through Faraday rotator 250 and become light 412(e) with the y-polarization. Light 412(e) enters birefringent wedge 240 as an e-ray. Light 412(e) is refracted at surfaces 242 and 232, and become light 413(o). Light 413(o) enters birefringent wedge 230 as an o-ray with the y-polarization and exits from birefringent wedges 230 in an output direction (i.e., the −z−β y direction). Light 413(o) enters PM fiber 203 through lens 220 as polarized optical signal S3.

In the implementation of three-port circulator in FIG. 2a, Faraday rotator 250 rotates the polarization of the light by an angle of substantially positive 45 degrees. In an alternative implementation, a Faraday rotator that rotates the polarization of the light by an angle of substantially negative 45 degrees can also be used.

In the implementation of three-port circulator in FIG. 2a, birefringent wedge 230 has the optical axis in the x-direction, and birefringent wedge 240 has the optical axis in the y-direction. In an alternative implementation, birefringent wedge 230 can have an optical axis in the cos(φ)x +sin(φ) y direction, and birefringent wedges 240 can have an optical axis in the cos(φ+90)x+sin(φ+90) y direction, where φ is any arbitrary angle.

In FIGS. 3a and 3b, polarized optical signal S1 exiting from PM fiber 201 enters birefringent wedge 230 as an e-ray; in FIGS. 4a and 4b, light exits from birefringent wedge 230 as an o-ray and enters PM fiber 203 as polarized optical signal S3. In an alternative implementation, polarized optical signal S1 exiting from PM fiber 203 can enter birefringent wedge 230 as an o-ray; light can exit from birefringent wedge 230 as an e-ray and enter PM fiber 201 as polarized optical signal S3.

Figure 5A:
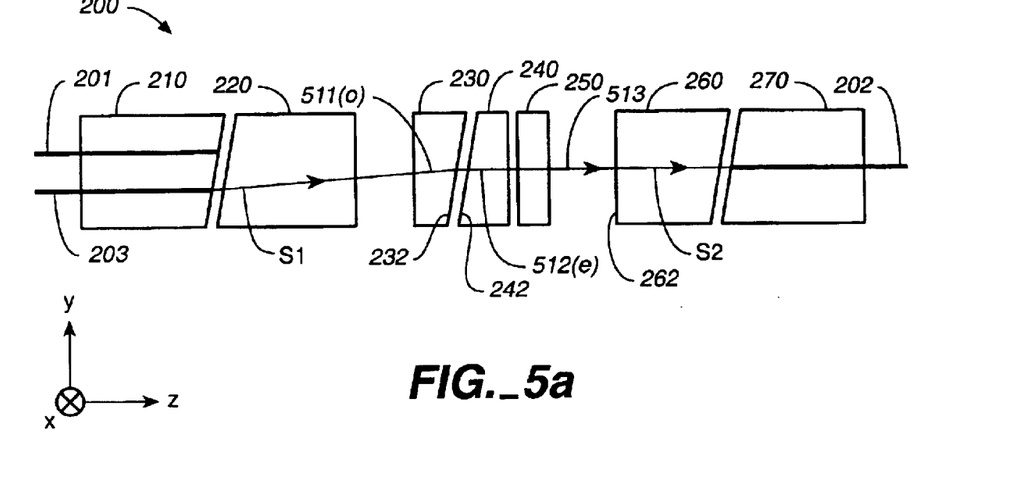
FIGS. 5a and 5b illustrate that a polarized optical signal S1 exiting from PM fiber 203 enters PM fiber 202 as a polarized optical signal S2.
Figure 5B:
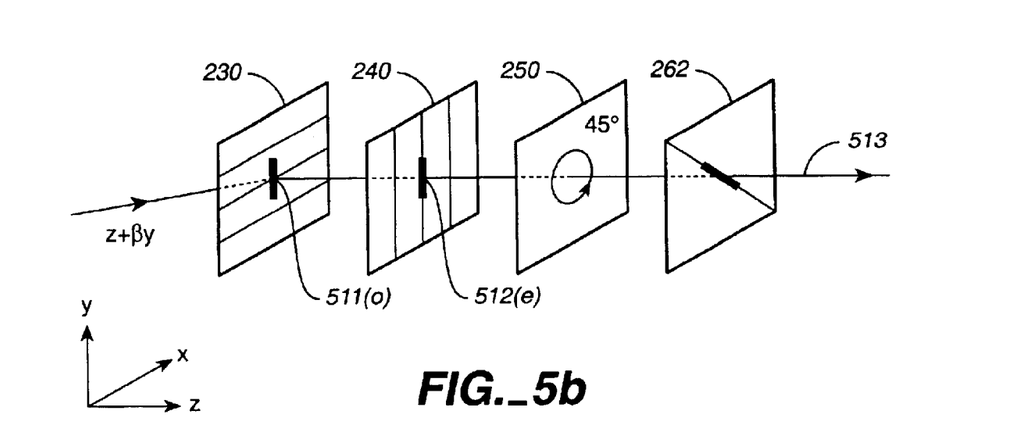

FIGS. 5a and 5b illustrate that polarized optical signal S1 exiting from PM fiber 203 enters PM fiber 202 as polarized optical signal S2. In more detail, polarized optical signal S1 exits from PM fiber 203 as light 511(o) with the y-polarization, and enters birefringent wedge 230 as an o-ray in an input direction (i.e., the z+βy direction). Light 511(o) is refracted at surfaces 232 and 242, and become light 512(e) traveling in the principal direction (i.e., the positive z-direction). Light 512(e) enters birefringent wedge 240 as an e-ray with the y-polarization, passes through Faraday rotator 250, and become light 513 with the x-y polarization traveling in the principal direction. Light 513 enters PM fiber 202 through lens 260 as polarized optical signal S2.

Figure 6A:
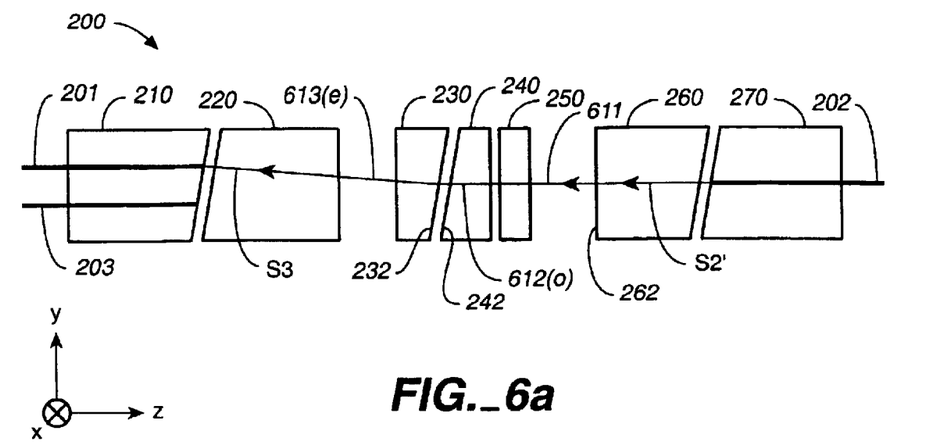
FIGS. 6a and 6b illustrate that a polarized optical signal S2' exiting from PM fiber 202 enters PM fiber 201 as a polarized optical signal S3.
Figure 6B:
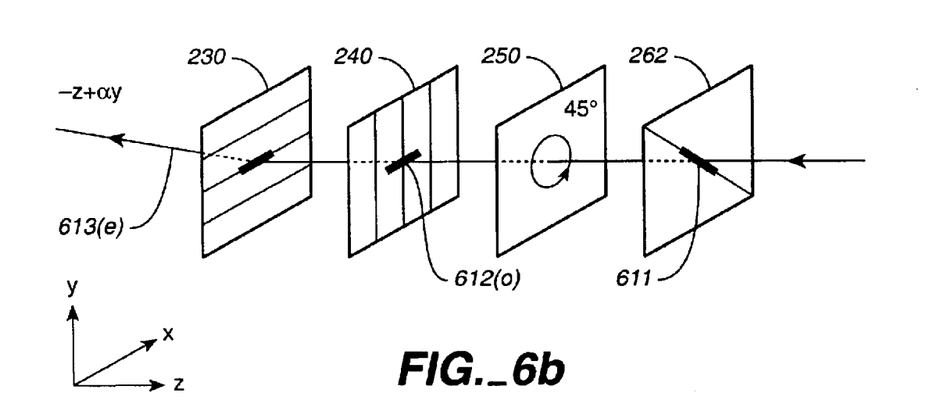

FIGS. 6a and 6b illustrate that polarized optical signal S2' exiting from PM fiber 202 enters PM fiber 201 as polarized optical signal S3. In more detail, polarized optical signal S2' exits from PM fiber 202 as light 611 with the x-y polarization traveling in the reverse principal direction (i.e., the negative z-direction). Light 611 with the x-y polarization passes through Faraday rotator 250 and become light 612(o) with the x-polarization. Light 612(o) enters birefringent wedge 240 as an o-ray. Light 612(o) is refracted at surfaces 242 and 232, and become light 613(e). Light 613(e) enters birefringent wedge 230 as an e-ray with the x-polarization and exits from birefringent wedge 230 in an output direction (i.e., the −z+αy direction). Light 613(e) enters PM fiber 201 through lens 220 as polarized optical signal S3.

Birefringent wedges 230 and 240 can be constructed from birefringent crystal materials, such as, calcite, rutile, lithium niobate or yttrium orthvanadate.

Figure 7A:
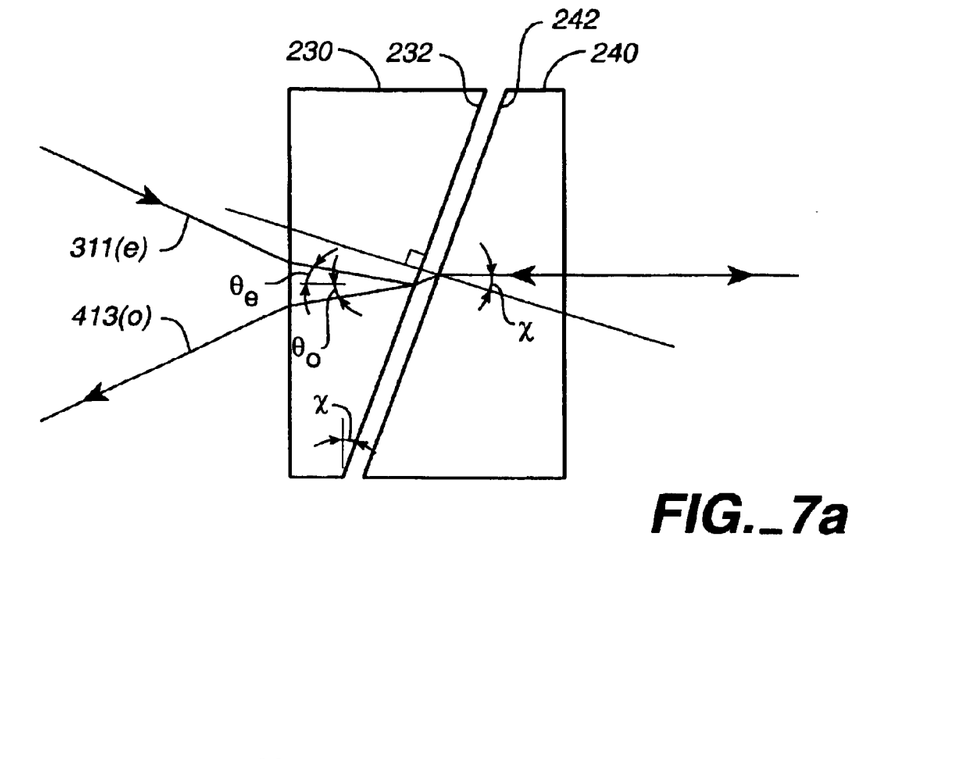
FIG. 7a illustrates an implementation of birefringent wedges 230 and 240 using birefringent crystal materials with $n_e$ larger than $n_o$.
Figure 7B:
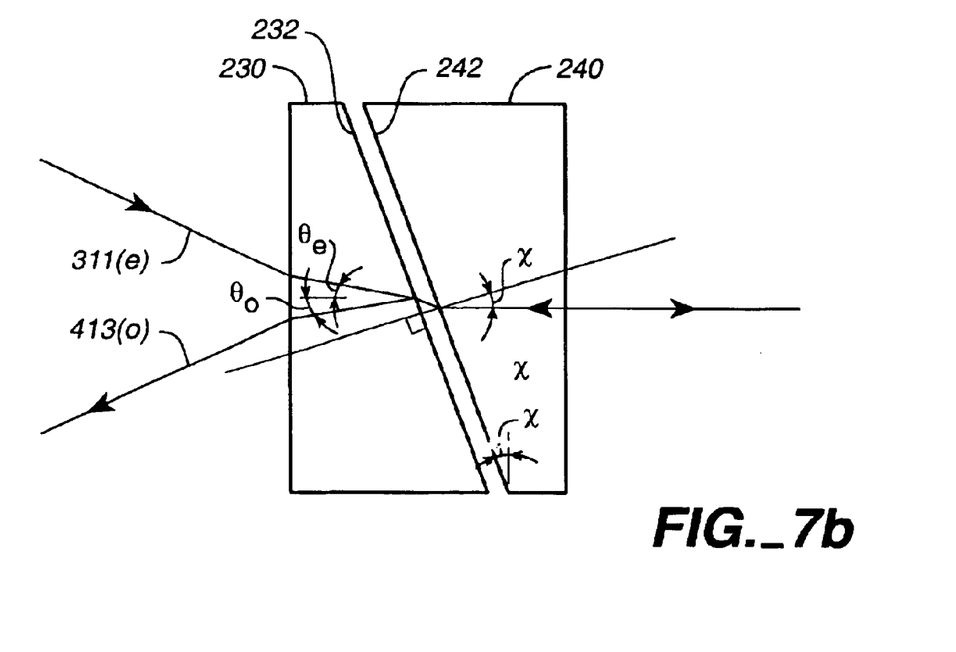
FIG. 7b illustrates an implementation of birefringent wedges 230 and 240 using birefringent crystal materials with $n_e$ smaller than $n_o$.

A birefringent crystal material in general has refractive indexes $n_e$ for e-rays and $n_o$ for o-rays. Birefringent wedges 230 and 240 can be constructed using birefringent crystal materials with indexes $n_e$ larger than $n_o$, or birefringent crystal materials with indexes $n_e$ smaller than $n_o$ FIGS. 7a and 7b illustrate implementations of birefringent wedges 230 and 240 in the form of tapered plate. Surface 232 of birefringent wedge 230 substantially parallels surface 242 of birefringent wedge 240. The tapering angle of birefringent wedges 230 and 240 is $_{102}$.

FIG. 7a illustrates an implementation of birefringent wedges 230 and 240 using birefringent crystal materials with indexes $n_e$ larger than $n_o$. FIG. 7a also illustrates the paths traveled by e-ray 311(e) and o-ray 413(o). E-ray 311(e) is incident upon surface 232 of birefringent wedge 230 in the $\cos(\theta_e)$ z−$\sin(\theta_e)$ y direction and exits from birefringent wedge 240 in the positive z-direction. Here $\theta_e$ satisfies equation $n_e \sin(_\chi-\theta_e)=n_o \sin(_\chi)$. O-ray 413(o) enters wedge 230 from surface 232 in the $-\cos(\theta_e)$ z−$\sin(\theta_e)$ y direction. Here $\theta_o$ satisfies equation $n_o \sin(_\chi+\theta_o)=n_e \sin(_{102})$.

FIG. 7b illustrates an implementation of birefringent wedges 230 and 240 using birefringent crystal materials with indexes $n_e$ smaller than no FIG. 7b also illustrates the paths traveled bye-ray 311(e) and o-ray 413(o). E-ray 311(e) is incident upon surface 232 of birefringent wedge 230 in the $\cos(\theta_e)$z−$\sin(\theta_e)$ y direction and exits from birefringent wedge 230 from surface 232 in the positive z-direction. Here $\theta_e$ satisfies equation $n_e \sin(_{102}+\theta_e)=n_o \sin(_\chi)$. O-ray 413(o) enters wedge 240 in the $-\cos(\theta_o)$z−$\sin(\theta_o)$ y direction. Here $\theta_o$ satisfies equation $n_o \sin(_\chi-\theta_o)=n_e \sin(_\chi)$.

A method and system has been disclosed for providing three-port circulators. Although the present invention has been described in accordance with the implementations shown, one of ordinary skill in the art will readily recognize that there could be variations to the implementations and those variations would be within the spirit and scope of the present invention. Accordingly, many modifications may be made by one of ordinary skill in the art without departing from the spirit and scope of the appended claims.

What is claimed is:

1. A three-port circulator adapted to be coupled to a plurality of polarization maintenance (PM) optical fibers comprising:

a non-reciprocal rotating element having a rotation axis and adapted to rotate a polarization of light passing therethrough by a predetermined angle;

a first birefringent wedge having a first optical axis substantially perpendicular to the rotation axis;

a first lens optically coupled to the first birefringent wedge, the first lens adapted to direct light existing from a first PM optical fiber to pass through the first lens and enter the first birefringent wedge in an input direction, and light exiting from the first birefringent wedge in an output direction to enter a second PM optical fiber; and a second birefringent wedge having a second optical axis substantially perpendicular to both the rotation axis and the first optical axis, the second birefringent wedge optically coupled between the non-reciprocal rotating element and the first birefringent wedge.

2. The three-port circulator of claim 1 wherein the predetermined angle is substantially 45 degrees.

3. The three-port circulator of claim 1 further comprising a capillary for holding the first and a second PM optical fibers proximate to the first lens.

4. The three-port circulator of claim 1 further comprising a second lens optically coupled to the second birefringent wedge.

5. The three-port circulator of claim wherein the second lens is adapted to direct light exiting from the non-reciprocal rotating element to enter a third PM optical fiber, and light exiting from the third PM optical fiber to enter the non-reciprocal rotating element.

6. The three-port circulator of claim further comprising a capillary for holding the third PM optical fiber proximate to the second lens.

7. The three-port circulator of claim 1 wherein the non-reciprocal rotating element is a Faraday rotator.

8. A method for circulating light comprising the steps of:

providing a multi-port circulator including a non-reciprocal rotating element for rotating a polarization of light passing therethrough by a first angle with respect to a rotation axis, a first birefringent wedge having a first optical axis, and a second birefringent wedge having a second optical axis forming a second angle with the first optical axis;

directing an input polarized optical signal received from a polarization maintenance (PM) optical fiber coupled to a first port of the multi-port optical circulator to pass sequentially through the first birefringent wedge, the second birefringent wedge, and the non-reciprocal rotating element, to provide a output polarized optical signal directed to a second port of the multi-ported optical circulator; and directing an input polarized optical signal received from a PM optical fiber coupsled to the second port to pass sequentially through the non-reciprocal rotating element, the second birefringent wedge and the first second birefringent wedge, to provide an output polarized optical signal directed to a third port of the multi-ported optical circulator.

9. The method of claim 8 wherein the non-reciprocal rotating clement is a Faraday rotator.

10. The method of claim 8 wherein the first angle is substantially 45 degrees.

11. The method of claim 8 wherein the second angle is substantially 90 degrees.

12. The method of claim 8 further comprising providing a first lens;

receiving the input polarized optical signal from the first port through the first lens; and transmitting the output polarized optical signal to the third port through the first lens.

13. The method of claim 8 further comprising providing a second lens;

transmitting the output polarized optical signal to the second port through the second lens; and receiving the input polarized optical signal from the second port through the second lens.

14. The method of claim 8 wherein the step of directing an input polarized optical signal received at the first port includes directing the Input polarized optical signal received at the first port to pass sequentially through the first birefringent wedge as an e-ray and the second birefringent wedge as an o-ray; and the step of directing an input polarized optical signal received at the second port includes directing the input polarized optical signal received at the second port to pass sequentially through the second birefringent wedge as an o-ray and the first birefringent wedge as an e-ray.

15. The method of claim 8 wherein the step of directing an input polarized optical signal received at the first port includes directing the input polarized optical signal received at the first port to pass sequentially through the first birefringent wedge as an o-ray and the second birefringent wedge as an e-ray, and the step of directing an input polarized optical signal received at the second port includes directing the input polarized optical signal received at the second port to pass sequentially through the second birefringent wedge as an e-ray and the first birefringent wedge as an o-ray.

16. A three-port circulator comprising:

first, second and third ports coupled to first, second and third polarization maintenance (PM) optical fibers, respectively;

a non-reciprocal rotating element having a rotation axis and adapted to rotate a polarization of tight passing therethrough by a predetermined angle;

a first birefringent wedge having a first optical axis substantially perpendicular to the rotation axis;

a first lens optically coupled to the first birefringent wedge, the first lens adapted to direct light exiting from the first PM optical fiber to pass through the first lens and enter the first birefringent wedge in an input direction, and light exiting from the first birefringent wedge in an output direction to enter the second PM optical fiber; and a second birefringent wedge having a second optical axis substantially perpendicular to both the rotation axis and the first optical axis, the second birefringent wedge optically coupled between the non-reciprocal rotating element and the first birefringent wedge.

17. A three-port circulator comprising:

first, second and third polarization maintenance (PM) optical fibers;

a first birefringent wedge;

a first lens optically coupled to the first birefringent wedge, the first lens adapted to direct light exiting from the first PM optical fiber to pass through the first lens and enter the first birefringent wedge in an input direction and light exiting from the first birefringent wedge in an output direction to enter the second PM optical fiber;

a second birefringent wedge optically coupled between a non-reciprocal rotating element and the first birefringent wedge;

and a second lens optically coupled to the second birefringent wedge adapted to direct light exiting from the non-reciprocal rotating element to enter the third PM optical fiber, and light exiting from the third PM optical fiber to enter the non-reciprocal rotating element.

18. A three-port circulator comprising:

first, second and third ports for receiving polarized light signals, each of the polarized light signals having only a single polarization along substantially only one axis;

a first birefringent wedge;

a first lens optically coupled to the first birefringent wedge, the first lens adapted to direct polarized light received form the first port to pass through the first lens and enter the first birefringent wedge in an input direction, and polarized light exiting from the first birefringent wedge in an output direction to enter the second port;

a second birefringent wedge optically coupled between a non-reciprocal rotating element and the first birefringent wedge;

and a second lens optically coupled to the second birefringent wedge adapted to direct polarized light exiting from the non-reciprocal rotating element to enter the third port, and polarized light exiting from the third port to enter the non-reciprocal rotating element.

* * * * *